United States Patent Office 3,341,479
Patented Sept. 12, 1967

3,341,479
TRIAMINOTRIPHENYLMETHANE MODIFIED PHENOLSULFONIC ACID-FORMALDEHYDE ION EXCHANGE RESIN MEMBRANES
Siegfried Aftergut, Schenectady, N.Y., assignor to General Electric Company, a corporation of New York
No Drawing. Filed Mar. 26, 1964, Ser. No. 355,074
2 Claims. (Cl. 260—2.2)

This invention relates to cation exchange resins. More particularly, it relates to a flexible cation exchange membrance formed from sulfonated aromatic compounds and to a method for producing such membranes.

Cation exchange materials may be formed by the reaction of various sulfonated aromatic compounds and aldehyde releasing substances. Among such aromatic compounds are sulfonated diphenylether and phenylsulfonic acid. However, the resin obtained by the reaction of the sulfonated aromatic compound with an aldehyde is hard and brittle. While such a resin may be used for ion exchange, membrances cannot be produced from it, unless they are mechanically supported. For example, a reinforcing cloth may be impregnated with the resin and the final structure cured to produce the ion exchange material. Obviously, a material having the ion exchange capabilities of the reaction product of an aldehyde compound with a sulfonated aromatic compound would be far more useful if it had sufficient flexibility and mechanical strength that an ion exchange membrance could be formed directly without the aid of a mechanical support.

In accordance with this invention, it has been found that the addition of an aminated alkaryl compound to the sulfonated aromatic-aldehyde reaction mixture provides a product combining the ion exchange propertes of the original compound, with sufficient flexibility and mechanical strength to allow the direct production of a self-supporting ion exchange membrance.

It is, therefore, one object of this invention to produce a flexible, self-supporting cation exchange resin.

It is a further object of this invention to provide a method for producing a flexible sulfonated aromatic compound-aldehyde-containing cation exchange resin.

Briefly, the product of this invention is produced by mixing a sulfonated aromatic compound with a small amount of an aminated alkaryl compound, particularly triaminotriphenylmethane, adding an aldehyde-releasing substance, such as paraformaldehyde, reacting the components, and heating the reaction product to effect a final cure. The curing is effected at a temperature of approximately 90° for a time sufficient to effect the cure. The curing step may be conducted in such a manner that the finally cured product is in a form which is suitable for immediate use as an ion exchange membrance or which may, by simple mechanical means such as cutting, be prepared for use as an ion exchange membrane.

The compound utilized to provide increased flexibility and greater mechanical strength is an aminated alkaryl compound, triaminotriphenylmethane. This compound, also known as leucaniline, has the structure

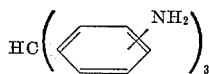

The leucaniline used may be any one of the three isomeric forms of the compound, namely ortho-, para′-, para″-; meta-, para′-, para″-; and para-, para′-, para″-, or may be a mixture of any two or all of them. The pure forms of these isomers have melting points ranging from 148° C. to 165° C.

Any of the sulfonated aromatic compounds which are commonly used to manufacture cation exchange membranes may be utilized in the practice of this invention. Among these sulfonated aromatic compounds are sulfonated diphenylether, phenolsulfonic acid, anisolesulfonic acid, alpha-naphthol-sulfonic acid, beta-naphtholsulfonic acid, and cresolsulfonic acid. The basic requirement is that the sulfonated compound be capable of reaction with an aldehyde to form a resin. Any of the aldehydes which provide cross-linking between aromatic groups may further be used in the practice of this invention. The preferred aldehyde is formaldehyde and it may be derived from the commonly available sources. Included among these sources are paraformaldehyde, hexamethylenetetramine, and the standard 37% aqueous solution of formaldehyde known as formalin. The formaldehyde should be present in the resin in an amount of from 1 to 4 moles per mole of the sulfonated aromatic compound. A preferred range is from 2 to 3 moles per mole.

Only a small amount of the leucaniline or triaminotriphenylmethane need be used in the compound. A resin which is sufficiently flexible to allow the formation of an ion exchange membrance without mechanical support means may be produced using as little as 1 mole of leucaniline for each 20 moles of sulfonated aromatic compound, or stated another way, 0.05 mole of leucaniline for each mole of the sulfonated aromatic compound. More than about 0.2 mole of leucaniline per mole of sulfonated aromatic compound is undesirable because of a decrease in cation exchange capacity caused by the addition of the leucaniline which has anion exchange groups, tending to neutralize some of the cationic sulfonic acid groups. The preferred range is from 0.06 mole to 0.2 mole of leucaniline per mole of sulfonated aromatic compound.

The final product must be cured at a temperature sufficiently high to provide cross-linking of the resin, but not so high as to destroy its valuable properties. The curing step may be conducted at from 80° C. to 95° C. The time for which a cure must be effected varies inversely with the temperature used in curing. Typical curing times range from 6 to 27 hours.

The following examples are illustrative of the formation of the products of this invention. These examples should not be considered as limiting in any way the full scope of the invention as covered by the appended claims.

Example I

Sulfonated diphenylether was prepared by stirring a mixture containing 170 gm. (1 mole) of diphenylether with 204 gm. (approximately 2 moles) of 96% sulfuric acid for 3 hours at about 130° C. The reaction product was titrated with sodium hydroxide, the results of the titration indicating that 85% of the sulfuric acid employed had been reacted. Further tests showed that the reaction product consisted mainly of the disulfonic acid derivative of the diphenyl ether, but additionally contained small amounts of the monosulfonic acid derivative, unreacted sulfuric acid, unreacted diphenyl ether, and water. This product was used in the subsequent reactions without further purification.

Example II

A 10 gm. portion of the sulfonated diphenylether prepared in Example I was stirred with 1 gm. of water and 1 gm. of leucaniline. After stirring the mixture was treated with a total of 2.5 gm. of paraformaldehyde which was added in small portions. After a complete blending of the paraformaldehyde, the reaction mixture was spread on glass slides and heated for 18½ hours at 90° C. A dark brown, cation-permeable membrane was obtained. A test of this membrane showed that it had a cation-exchange capacity of 1.9 milliequivalents per dry gram.

The cation exchange capacity, as used in this application, is the number of milliequivalents of material per gram of dry resin which are ionizable to positive ions. Thus, $$CEC = \frac{meq.}{W}$$

where CEC is the cation exchange capacity in milliequivalents per gram of dry resin and meq. is the number of milliequivalents of cations exchanged by W grams of dry resin. Thus, a cation exchange capacity of 1.9, by the above definition, means that the material has 1.9 milliequivalents of material ionizable to positive ions per gram of dry resin.

Example III

A membrane was produced according to the procedure, and using the same materials in the same amounts described in Example II. The single exception was that 1.5 gm. of leucaniline was utilized for this membrane. Following cure, the resin was tested for ion exchange capacity, and was found to have a capacity of 1.4 milliequivalents per dry gram.

Example IV

A mixture was prepared containing 10 gm. of phenolsulfonic acid and 1 gm. of leucaniline. This mixture was treated with 8.8 gm. of 37% formalin. This mixture was placed between glass slides and heated for 8 hours at 90° C. A dark brown membrane was produced, the electrical properties of which were measured in a 1 normal solution of hydrochloric acid. The resistance of a circular segment of the membrane having a diameter of 1.5 inches and a thickness of about 48 mils was 0.15 ohm.

The sulfonated aromatic compound-leucaniline cation exchange resins of the present invention may be formed into membranes, broadly, by casting a mixture of the ingredients onto an inert support, such as a glass or metal plate. The inert support is coated with a release compound, such as a silicone fluid, so as to allow easier removal of the membrane after curing. The ingredients are covered with another inert plate coated with a similar release compound. After curing, the cured membrane may be removed from the supports. The size of the membranes which may be formed has no theoretical limit, being limited practically only by the size of the apparatus in which they are to be used. Membranes having dimensions of at least 0.25 inch on two sides are generally prepared. Other methods of casting the membranes of the present invention will be apparent to those skilled in the art.

The cation exchange resins produced in accordance with this invention may be utilized in any of the applications in which ion exchange membranes are normally employed. For example, such materials may be used in dialysis cells for applications such as desalting water, desalting sugar juices, recovery of waste steel pickling acid, and purification of radioactive wastes. Additionally, the membranes may be used as separators in fuel cells.

The resins may, of course, be formed into pellets, rods, bars, etc., for use in ion exchange processes and demineralization of water. In this form they may be used in any of the processes in which ion exchange resins are generally used.

While specific embodiments of the invention have been shown and described, the invention should not be limited to the particular formulas shown. It is intended, by the appended claims, to cover all modifications within the spirit and scope of this invention.

What is claimed as new and desired to be secured by Letters Patent of the United States is:

1. A process for forming a flexible cation exchange structure having at least two dimensions in excess of 0.25 inch comprising
    mixing triaminotriphenylmethane and a sulfonated aromatic compound chosen from the group consisting of sulfonated diphenyl ether, phenolsulfonic acid, anisolesulfonic acid, alpha-naphthol-sulfonic acid, beta-naphtholsulfonic acid, and cresolsulfonic acid,
    reacting the mixture formed by said triaminotriphenylmethane and said sulfonated aromatic compound with an aldehyde chosen from the group consisting of formaldehyde and paraformaldehyde, and
    shaping and heating to cure at a temperature of from about 80 to 90 C. for about 6 to 27 hours.
2. The product formed by the process of claim 1.

References Cited

UNITED STATES PATENTS 2,333,754   11/1943   Wassenegger _____ 260—2.2

FOREIGN PATENTS 432,143   7/1935   Great Britain.

SAMUEL H. BLECH, Primary Examiner.

WILLIAM H. SHORT, Examiner.

C. A. WENDEL, M. GOLDSTEIN, Assistant Examiners.